(No Model.)
G. P. ANDREWS.
FISHING ROD.
No. 252,008. Patented Jan. 10, 1882.
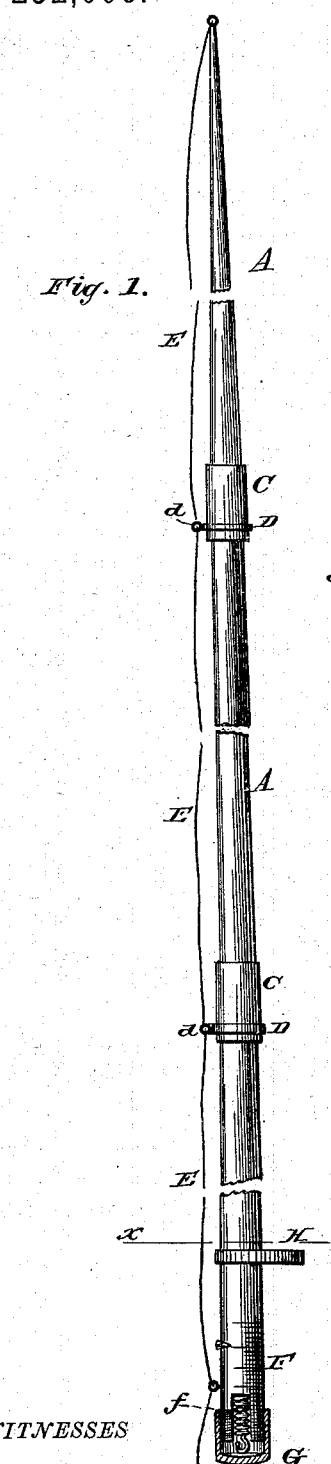
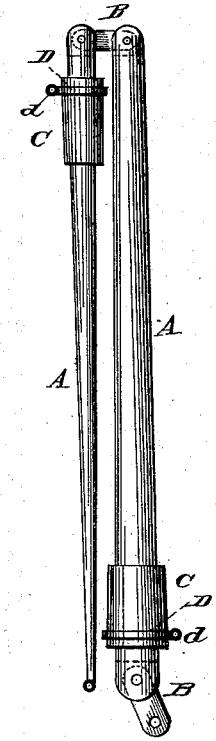
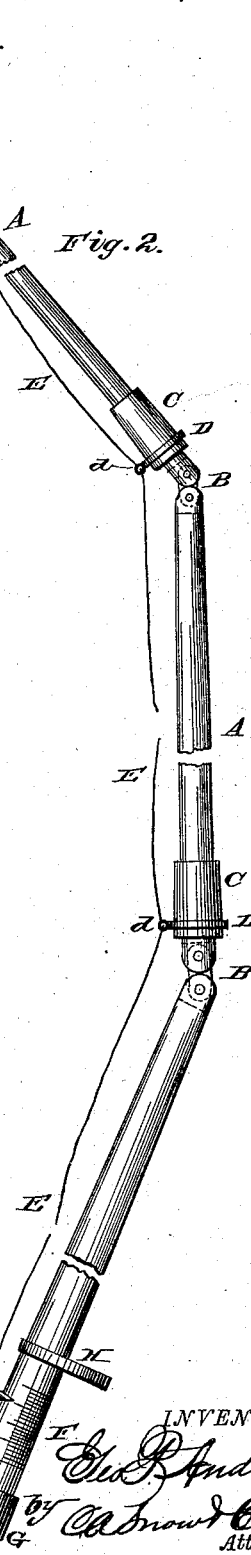
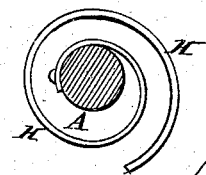
WITNESSES
INVENTOR
Attorneys

UNITED STATES PATENT OFFICE.

GEORGE P. ANDREWS, OF STAFFORDVILLE, CONNECTICUT.

FISHING-ROD.

SPECIFICATION forming part of Letters Patent No. 252,008, dated January 10, 1882.

Application filed October 4, 1881. (No model.)

*To all whom it may concern:*

Be it known that I, GEORGE P. ANDREWS, of Staffordville, in the county of Tolland and State of Connecticut, have invented certain new and useful Improvements in Fishing-Rods; and I do hereby declare that the following is a full, clear, and exact description of the invention, which will enable others skilled in the art to which it appertains to make and use the same, reference being had to the accompanying drawings, which form a part of this specification.

The object of this invention is to provide certain improved details of construction in a fishing-rod. This object I attain by means of the devices illustrated in the drawings, in which—

Figure 1 represents the rod with its several lengths secured in line. Fig. 2 shows the same with two lengths partly closed. Fig. 3 represents two lengths folded together, and Fig. 4 is a sectional view on the line $x\,x$, Fig. 1.

A A indicate several lengths of a fishing-pole, that are hinged together by the hinge-links B, pivoted in the ends of said lengths or sections. The sliding ferrules C, that are arranged upon the sections of the pole, will be slipped over the joints to maintain the pole ready for use, as shown in Fig. 1, or they will be slipped back from the joints when it is desired to fold the sections together, as shown in Figs. 2 and 3. Short bands or ferrules D are provided on said sections for the eyes $d$, through which the fishing-line E will pass. Within the butt-end of the first or large section I arrange a small steel balance, $f$, and upon the pole I arrange a graduated scale, F, for the pointer of this balance. I also provide a suitable cap, G, by means of which the end containing the balance can be closed when it is not desired to use the latter. I also secure a coiled spring, H, to the first section, and so arrange it that in folding the sections it can be grasped at one end and straightened out to allow the sections to come together, after which, upon releasing the spring, it will spring once or twice around the folded sections, thereby holding them together. By employing these hinge-links the sections can be folded parallel with each other, and also there will be no danger of the loss of any part of the pole, whether folded or straightened out.

For common poles the links might be pivoted in mortises in the wood and bands employed to prevent the pivots from splitting the wood; but, if preferred, the sections of the pole can have metal sockets secured at their ends.

What I claim is—

The combination, with a fishing-pole composed of lengths or sections hinged together, of the spring fastening device H, for the purpose specified.

In testimony that I claim the foregoing as my own I have hereto affixed my signature in presence of two witnesses.

GEORGE P. ANDREWS.

Witnesses:
LUCIAN WASHBURN,
JAMES M. CHAFFEE.